(12) United States Patent
D'Achard Van Enschut

(10) Patent No.: US 6,994,626 B1
(45) Date of Patent: Feb. 7, 2006

(54) METHOD FOR OPERATING A VIDEO GAME WITH BACKFEEDING A VIDEO IMAGE OF A PLAYER, AND A VIDEO GAME ARRANGED FOR PRACTICING THE METHOD

(75) Inventor: Johannes F. M. D'Achard Van Enschut, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 470 days.

(21) Appl. No.: 09/022,132

(22) Filed: Feb. 11, 1998

(30) Foreign Application Priority Data

Feb. 14, 1997 (EP) ................................. 97200421

(51) Int. Cl.
*A63F 9/22* (2006.01)
(52) U.S. Cl. ........................................ 463/31
(58) Field of Classification Search .................. 463/6, 463/30–34, 40–42; 348/13–20
See application file for complete search history.

(56) References Cited

U.S. PATENT DOCUMENTS

| | | | | |
|---|---|---|---|---|
| 4,508,353 A | * | 4/1985 | Meyer et al. ................... 463/2 |
| 4,521,014 A | | 6/1985 | Sitrick ...................... 273/1 GC |
| 4,572,509 A | * | 2/1986 | Sitrick ........................... 273/85 |
| 4,710,873 A | | 12/1987 | Breslow et al. ............. 364/410 |
| 4,987,492 A | * | 1/1991 | Stults et al. ................. 358/181 |
| 5,107,443 A | * | 4/1992 | Smith et al. ................. 395/158 |
| 5,553,864 A | * | 9/1996 | Sitrick .......................... 463/31 |
| 5,595,389 A | * | 1/1997 | Parulski et al. .............. 463/31 |
| 5,657,246 A | * | 8/1997 | Hogan et al. ............... 348/515 |
| 5,820,463 A | * | 10/1998 | O'Callaghan ................. 463/42 |
| 5,821,983 A | * | 10/1998 | Weiss .......................... 348/14 |
| 5,830,065 A | * | 11/1998 | Sitrick .......................... 463/31 |

FOREIGN PATENT DOCUMENTS

GB       2205188 A      11/1988

* cited by examiner

Primary Examiner—Corbett Coburn
(74) Attorney, Agent, or Firm—Larry Liberchuk

(57) ABSTRACT

In a video gaming environment, a player is enabled to interact with the environment. Further, a score and/or performance of the player in a particular session is machine detected and fed fed back into the gaming environment and a representation of said score and/or performance is displayed in visual form through an item that identifies the player in question. In particular, the method automatically takes up a video image of the player in question as said representation for subsequent video display in said gaming environment.

19 Claims, 1 Drawing Sheet

METHOD FOR OPERATING A VIDEO GAME WITH BACKFEEDING A VIDEO IMAGE OF A PLAYER, AND A VIDEO GAME ARRANGED FOR PRACTICING THE METHOD

BACKGROUND OF THE INVENTION

The invention relates to a method for operating a video game, said method comprising the steps of:
  enabling a player to interact with a gaming environment, machine-detecting a score and/or performance of the player in a particular session,
  backfeeding into the gaming environment a representation of said score and/or performance in visual form through an item that identifies the player in question. A method of this kind is known from GB 2,205,188. Generally, the game may be an arcade game, a PC-based game that gets its software on a local CD-ROM player, or a network-based game that operates off-line and get its software through downloading. Various other configurations of such gaming environment are feasible. In a network environment, the game may be conducted off-line with a single player, off-line with multiple players, or even on-line with multiple players. The realization of the environment may be as conventional as a fruit machine, or high tech through using virtual reality features.

Various people have seen the advantage of rewarding players in video games with the presentation of their identity. The above reference uses a printed ticket for outputting the name of a player alone or in combination with an attained score. The present invention has recognized that present day technology can attain a much higher degree of liveliness, especially in view of falling prices of various devices. In particular, video aspects of such a gaming environment have been experienced as being interesting to user persons.

SUMMARY TO THE INVENTION

Amongst other things, it is therefore an object to present the player with a lifelike or video image of him or herself. Accordingly, the invention is characterized by automatically taking up a video image of the player in question as said representation for subsequent video display in said gaming environment. Compared with the remaining elements of the gaming environment that often comprise a great amount of electromechanical hardware, the price of a camera has fallen dramatically. Furthermore, confrontation of a player with an other person's image being displayed in the actual gaming environment, has been felt as extremely tantalizing. The nature of the image may be a photograph or even a dynamic clip of the player.

Advantageously, the invention comprises a ranking step among players in respectively successive playing sessions, and displaying images of high-ranking players in a relatively persistent manner with respect to subsequent playing sessions. In this manner, competition among various players is raised still further. Top players could have a display that is persistent over a relatively long period, such as one day or even one week.

Advantageously, for use in a multiple player environment, the video image is selectively and cross-wise fed back to said multiple players. This enhances the competitive character of such a game still further: for example in a car-racing environment all players could have the face of the leading driver on their display during further racing.

Advantageously, the video image is made part of a composite image together with selective items taken from memory. Such item could relate to a characteristic attire worn in the real-life counterpart of the game, such as a space suit, or a particular interesting person related or not to the gaming environment in question, such as President Clinton or movie star Debi Moore.

Advantageously, the player person is allowed to suppress during the session a presentation of said actual score and/or performance to said backfeeding mechanism. This allows a person to remain anonymous if required; the realization can be effected through answering a system question by a keyboard command.

The invention also relates to a video game arranged for practising the above method. Further advantageous aspects of the invention are recited in dependent claims.

BRIEF DESCRIPTION OF THE DRAWING

These and other aspects and advantages of the invention will be discussed more in detail with reference to the disclosure of preferred embodiments hereinafter, and in particular with reference to the Figures wherein.

DETAILED DESCRIPTION OF PREFERRED EMBODIMENTS

Figure 1:
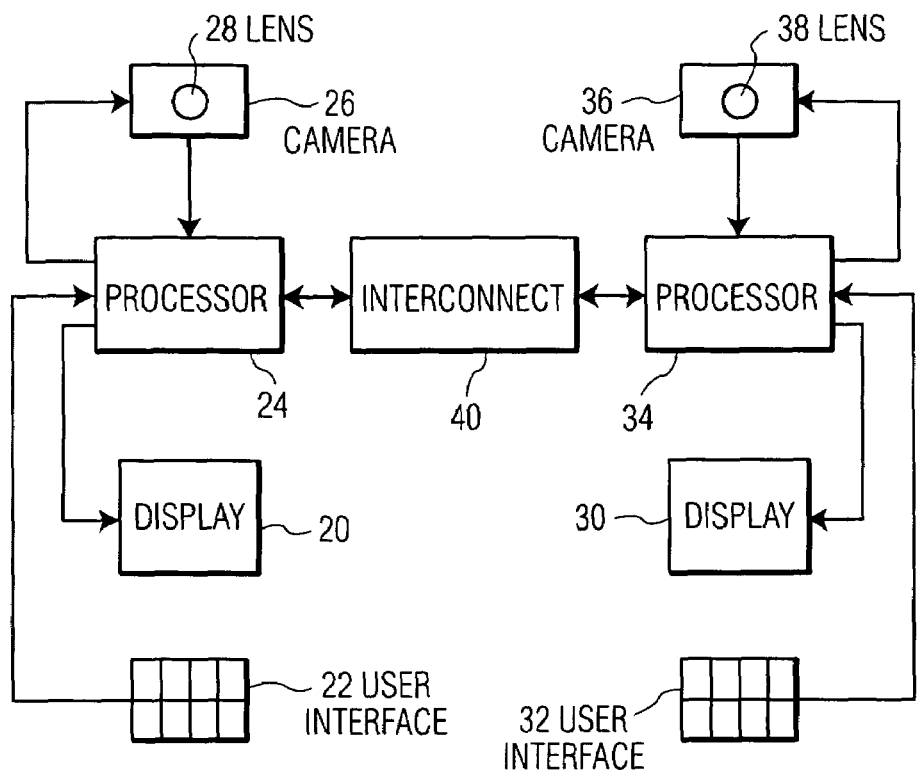
FIG. 1 is a block diagram of a multi-player environment.

FIG. 1 is a block diagram of a multi-player environment. At left is the setup for the first player person. Here, item 22 symbolizes the user interface. As shown, it is a multikey-keyboard. However, various other such interfaces have become known, such as a joystick, a steering wheel, an electronic pinball interface as recited in U.S. application Ser. No. 08/823,577 (PHN 15.755) to the present assignee. In particular, the interface may be bidirectional. The signals from the user interface are sent to the local processing device 24. This local processing device generates an image on display 20. Furthermore, it sends a control signal to local camera arrangement 26 that is focused through lens 28 on the local player, or at least on a position where this player is supposed to be. The camera is attached for sending the image information to local processing device 24. Now, in a stand-alone setup the processing device 24 calculates the score of the player. This score may represent the number of hits in a shooting game, the number of points and/or jackpot hits in a pinball machine environment, or other scores as applicable. In certain circumstances such as the gaining of a particular number of points, processing device 24 may transmit a command to camera 26 so that an image of the player is taken up through appropriate focus and direction of lens 28. The image signals are digitized and transferred to central processing device 24 for more or less persistent storage in local memory that has not been shown separately. If the player would object against taking this image, at the beginning of the gaming session an appropriate command must be given upon a machine-generated question.

In a subsequent gaming session, the image so taken up can be displayed on display 20, for example, at the start of the session, or rather, during the evolution of the game as specified in the gaming rules. In case a plurality of pictures have been taken up during successive gaming sessions the processing device 24 through some kind of ranking mechanism may give preference to the image of a particular player in favour of other images. The ranking mechanism may be permanent, for example in that always the top player of the last week has his image displayed. Other ranking strategies could introduce some random character in that the selection is made among a plurality of images.

At right in the Figure a similar setup is shown with corresponding items 30, 32, 34, 36 and 38. First, this second game could also represent a stand-alone environment. Alternatively, competition between two simultaneous players could be introduced in that the two processing devices 24 and 34 are joined through some interconnection mechanism 40. The latter could be a local network, an interconnection to the Internet system or any appropriate item. Now, the two gaming sessions can be joined to each other, for example, in a racing duel. For example, the camera could take up the images of the driver that actually leads the pack, for display on all displays 20, 30. An alternative is that the images may actually figure in the game in that they actually become part of the game. For example, in a boxing game, the highest ranking player of a recent past could be superposed to the image of the actual player's opponent.

Figure 2:
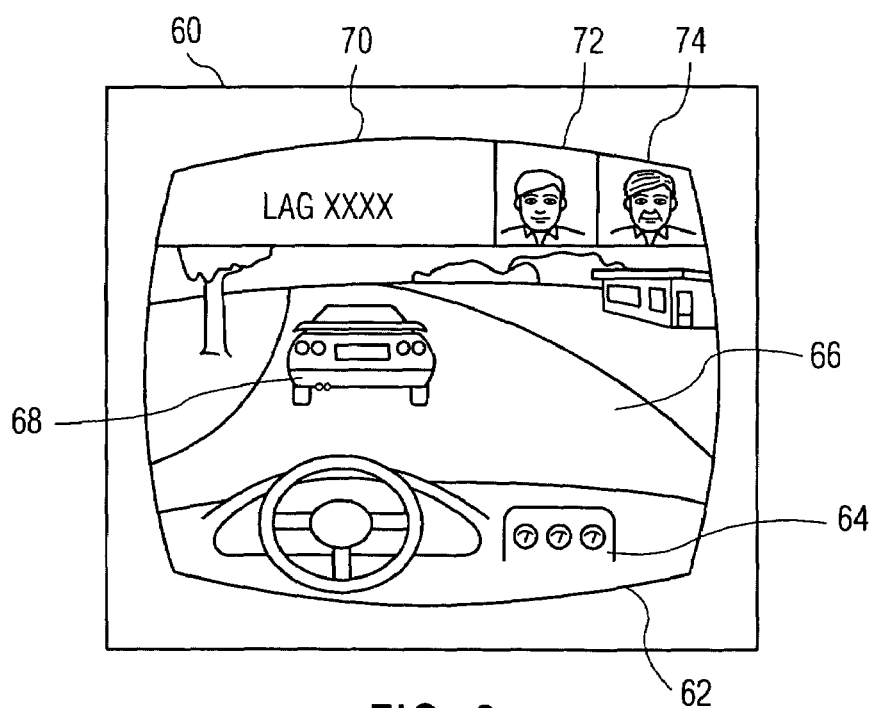
FIG. 2 is an instantaneous representation of a game image together with a player image.

FIG. 2 is an actual image of a racing game. The display device 60 has been shown with the actual image screen 62 in its centre. The image first contains the dashboard 64 of the driver (=player) in question. In front of the actual car the road 66 to be taken has been shown. Far out in front can be seen the car 68 of the driver that leads the pack. In the upper part of the screen, that may have a different aspect ratio from the one shown here, various game parameters are displayed. First, field 70 shows the lag of the driver in question behind the leading driver, second field 72 shows an image of the face of the driver who is actually in front, and field 74 shows the driver that has covered the overall racing circuit in the shortest time. If the present player himself is actually leading the pack, either the field for the image of the leading driver is empty, or the image of the actual driver is displayed.

At the end of the session, the image of the victorious driver may be printed, together with a textual identifier such as name or initials, and further relevant data, such as actual score, calender date, names of other players and their respective scores, etcetera. A particular feature is to join the image of the victorious driver with another image, or even a clip taken from memory. By itself, the joining of images into a single picture is known technology, that is made easier and more natural if the camera through good focusing creates an image that has a well-defined circumference, so that a particular "hole" may be filled with an image taken from memory. The printing may be on paper or similar material, or even on a CD-ROM rewritable, if the game program had been provided on such support. The printing may be effected remotely, such as on only one of the networked terminals of FIG. 1. If applicable, the display may be in the form of a short movie fragment or so-called clip.

What is claimed is:

1. A method for operating a multi-player video game, the method comprising:
    enabling each player of multiple players to interact with a gaming environment,
    machine-detecting a score and/or performance of each player in a particular session of the video game,
    backfeeding into the gaming environment a video image of a currently high-scoring player, and
    displaying the gaming environment, and the video image of the currently high-scoring player of the multiple players in a predefined field that is set off and less than the entire playing field, the predefined field associated with the gaming environment that is configured to contain the video image of the currently high-scoring player during the particular session of the video game.

2. A method as claimed in claim 1, furthermore comprising
    ranking high-scoring players in respectively successive playing sessions, and
    providing a representation of one or more of the high-ranking players for display in subsequent playing sessions, based on the ranking.

3. A method as claimed in claim 1, for use in a multiple player environment, wherein the video image of select players of the multiple players is selectively cross-wise fed back to the multiple players.

4. A method as claimed in claim 1, wherein the video image of select players of the multiple players is made part of a composite image with one or more selected items taken from memory.

5. A method as claimed in claim 1, further allowing the player to suppress during the session a presentation of the actual score, performance and/or video image to the backfeeding.

6. The method of claim 1, wherein displaying the image of the currently high scoring player includes
    displaying the image of the currently high scoring player persistently during the particular session.

7. The method of claim 1, wherein the predefined field is located in a prominent location relative to the gaming environment.

8. A video game system being arranged for running a multi-player video gaming environment, comprising
    a user interface that is configured to enable each player of multiple players to interact with the gaming environment,
    a detector that is configured to detect a score and/or performance of each player during a particular session of the video game,
    a backfeeding device that is configured to:
        backfeed into the gaming environment a video image of a currently high-scoring player of the multiple players, and
    a display that is configured to display the gaming environment, and the video image of the currently high-scoring player, wherein the image of the currently high scoring player is displayed in a predefined field that is set off and less than the entire playing field, the predefined field is associated with the gaming environment and is configured to contain the image of the currently high scoring player during the particular session of the video game, and
    one or more cameras that are configured to provide the video image of each player.

9. A system as claimed in claim 8, furthermore comprising ranking means for relatively ranking players in respectively successive playing sessions, and control means fed by the ranking means for providing video images of the high-ranking players to subsequent playing sessions.

10. A system as claimed in claim 8, arranged for implementing a multiple player gaming environment, and having cross-wise communication means for selectively cross-wise backfeeding the video image to multiple players.

11. The system of claim 8, wherein
    the display is configured to display the image of the currently high scoring player in the predefined field persistently during the particular session.

12. The system of claim 8, wherein the predefined field is located in a prominent location relative to the gaming environment.

13. A method for operating a multi-player video game where each player of multiple players interacts with a gaming environment, the method comprising:

defining a field of a display that is set off and less than the entire gaming environment and that is configured to contain an image of a highest performing player, determining a current performance level of each player during a particular session of the video game, and displaying a video image of one of the multiple players that has the currently highest performance level of the multiple players in the field of the display together with the gaming environment during the particular session of the video game.

14. A method as claimed in claim 13, comprising:

ranking high-scoring players in respectively successive playing sessions, and providing a representation of one or more of the high-ranking players for display in subsequent playing sessions, based on the ranking.

15. A method as claimed in claim 13, comprising backfeeding a video image of select players of the multiple players cross-wise back to the multiple players.

16. A method as claimed in claim 15, comprising enabling a player to suppress during the particular session at least one of a presentation of an actual present score, performance and video image of the player to the backfeeding.

17. A method as claimed in claim 13, comprising displaying a video image of select players of the multiple players as a part of a composite image with one or more selected items taken from memory.

18. The method of claim 13, wherein displaying the video image of the currently high scoring player includes displaying the image of the currently high scoring player persistently during the particular session.

19. The method of claim 13, wherein the predefined field is located in a prominent location relative to the gaming environment.

* * * * *